(12) United States Patent
Yapel

(10) Patent No.: US 7,819,077 B2
(45) Date of Patent: Oct. 26, 2010

(54) DIE COATERS

(75) Inventor: Robert A. Yapel, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1268 days.

(21) Appl. No.: 10/595,152

(22) PCT Filed: Sep. 17, 2004

(86) PCT No.: PCT/US2004/030579
§ 371 (c)(1),
(2), (4) Date: Mar. 7, 2006

(87) PCT Pub. No.: WO2005/028123
PCT Pub. Date: Mar. 31, 2005

(65) Prior Publication Data
US 2006/0269673 A1  Nov. 30, 2006

(51) Int. Cl.
*B05C 11/02* (2006.01)
(52) U.S. Cl. .............. 118/100; 425/141; 425/466; 425/191; 118/410; 118/419; 118/325
(58) Field of Classification Search .............. 425/141, 425/466, 191; 118/410, 419, 325
See application file for complete search history.

(56) References Cited

U.S. PATENT DOCUMENTS 3,241,183 A  3/1966  Tyrner
3,289,632 A * 12/1966 Barstow .............. 118/412
4,145,173 A *  3/1979 Pelzer et al. .......... 425/224
4,984,533 A *  1/1991 Takahashi et al. ...... 118/415

(Continued)

FOREIGN PATENT DOCUMENTS

EP  0412187 A  2/1991

(Continued)

OTHER PUBLICATIONS

Bird, Armstrong and Hassager, "Dynamics of Polymeric Liquids," vol. 1, Wiley & Sons, NY 1987, ISBN 0-471-80245-X, pp. 175-178.

(Continued)

*Primary Examiner*—Parviz Hassanzadeh
*Assistant Examiner*—Albert Hilton
(74) *Attorney, Agent, or Firm*—Douglas R. Little

(57) ABSTRACT

A method for forming a coating layer is provided according to the invention. The method includes steps of assembling a die coater comprising a first die block (12), a second die block (14), and a plurality of fasteners (40) holding the first die block and the second die block together, wherein each of the plurality of fasteners provides a compression force between the first die block and the second die block, and the first die block and the second die block are constructed to provide an internal manifold (16) and a coating slot (18), and extruding a coating material through the internal manifold and the coating slot. The coating slot can be adjusted to provide a more uniform coating slot along the length of the coating slot by adjusting the compression force of the fasteners, utilizing an offset bracket (80), adjusting the die bolt locations, adjusting the die overhang, providing a non-uniform shim (30), or a combination thereof. A die coater is additionally described.

9 Claims, 6 Drawing Sheets

U.S. PATENT DOCUMENTS

| | | | |
|---|---|---|---|
| 5,067,432 A | 11/1991 | Lippert | |
| 5,137,758 A | 8/1992 | Kistner et al. | |
| 5,143,744 A | 9/1992 | Barth et al. | |
| 5,312,683 A | 5/1994 | Chou et al. | |
| 5,340,613 A | 8/1994 | Hanzalik et al. | |
| 5,354,379 A | 10/1994 | Milbourn et al. | |
| 5,360,629 A | 11/1994 | Milbourn et al. | |
| 5,368,894 A | 11/1994 | Lammers et al. | |
| 5,378,542 A | 1/1995 | Hanzalik et al. | |
| 5,415,993 A | 5/1995 | Hanzalik et al. | |
| 5,587,184 A | 12/1996 | Leonard et al. | |
| 5,639,305 A | 6/1997 | Brown et al. | |
| 5,655,948 A | 8/1997 | Yapel et al. | |
| 5,725,665 A | 3/1998 | Yapel et al. | |
| 5,741,549 A | 4/1998 | Maier et al. | |
| 5,759,274 A | 6/1998 | Maier et al. | |
| 5,780,109 A | 7/1998 | Yapel et al. | |
| 5,837,324 A | 11/1998 | Yapel et al. | |
| 5,843,530 A | 12/1998 | Jerry et al. | |
| 5,849,363 A | 12/1998 | Yapel et al. | |
| 5,851,137 A | 12/1998 | Bhave et al. | |
| 5,861,195 A | 1/1999 | Bhave et al. | |
| 5,980,992 A | 11/1999 | Kistner et al. | |
| 5,998,549 A | 12/1999 | Milbourn et al. | |
| 6,007,874 A | 12/1999 | Bhave et al. | |
| 6,117,237 A | 9/2000 | Yapel et al. | |
| 6,418,604 B1 | 7/2002 | Edman et al. | |
| 2001/0002281 A1 | 5/2001 | Mandai et al. | |
| 2003/0116881 A1 | 6/2003 | Nelson et al. | |
| 2004/0103057 A1 | 5/2004 | Melbert et al. | |
| 2005/0028123 A1 | 2/2005 | Pekin et al. | |

FOREIGN PATENT DOCUMENTS

| | | |
|---|---|---|
| JP | 2005-288377 | 10/2005 |
| WO | WO 95/29763 | 11/1995 |
| WO | WO 95/29764 | 11/1995 |
| WO | WO 95/29765 | 11/1995 |

OTHER PUBLICATIONS

Cohen, Edward and Gutoff, Edgar, "Modern Coating and Drying Technology", VCH Publishers, NY, 1992, ISBN 3-527-28246-7, pp. 117-122.

Gutoff, Edgar and Cohen, Edward, "Coating and Drying Defects: Troubleshooting Operating Problems", Wiley Interscience, NY, ISBN 0-471-59810-0, pp. 96-103.

* cited by examiner

DIE COATERS

FIELD OF THE INVENTION

The invention relates to methods for forming a coating layer having substantially uniform thickness, and to die coaters that can be used to form a coating layer having substantially uniform thickness.

BACKGROUND OF THE INVENTION

In the manufacturing of coated products, it is often desirable to attain a coating having a substantially uniform thickness. This is especially true for products for optical or electronic applications.

The production of high quality articles, such as electronic, tape, optical, photographic, photothermographic, thermographic, abrasives, adhesive, display, and pharmaceutical articles, involves the application of a thin film of a coating material onto a continuously moving substrate or web. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. The uniformity of the coating layer depends on a number of factors including the uniformity of pressure across the coating slot, the uniformity of flow of the coating material across the coating slot, the precision of the coating slot through which the coating material (or extrudate) passes. Coatings can be applied as a single layer or as two or more superimposed layers. Although it is usually convenient for the substrate to be in the form of a continuous web, the substrate may also be formed to a succession of discrete sheets.

SUMMARY OF THE INVENTION

This invention provides for adjusting the forces that hold the die blocks together to change the die slot or coating slot to improve coating uniformity. For a given coating material and flow rate, and for a die having a well designed manifold and coating slot or die slot, it is expected that the best coating uniformity will result from a uniform die slot. For a mismatch of the manifold design to the liquid rheology and flows, a non-uniform slot might be the best for coating uniformity. This discussion focuses on making the coating slot uniform, but it is understood that it is possible that another optimum profile of the coating slot might be the target for other cases (such as where the rheology and flow rates are not a good match to the manifold design) and that these methods could be used to attain that optimum slot profile.

A method for forming a coating layer is provided according to the invention. The method includes steps of assembling a die coater comprising a first die block, a second die block, and a plurality of fasteners holding the first die block and the second die block together, wherein each of the plurality of fasteners provides a compression force between the first die block and the second die block, and the first die block and the second die block are constructed to provide an internal manifold and a coating slot, and extruding a coating material through the internal manifold and the coating slot.

The method for forming a coating layer includes a step of adjusting the die coater to provide the coating slot with a profile having a height uniformity of within about 2%. One technique for providing the coating slot with a profile having a height uniformity of within about 2% includes adjusting the compression force on at least one of the plurality of fasteners. An alternative embodiment of the method includes providing an offset bracket wherein at least two of the plurality of fasteners extend through the offset bracket. The offset bracket distributes the compression force between the first die block and the second die block differently than would be provided without the offset bracket. An additional alternative embodiment of the method includes adjusting the location of at least one of the plurality of fasteners to alter the distribution of the compression force between the first die block and the second die block. Another alternative embodiment includes utilizing a shim having a non-uniform thickness to compensate for the compression force between the first die block and the second die block.

A die coater is provided according to the invention. The die coater includes a first die block, a second die block, and a plurality of fasteners holding the first die block and the second die block together. Each of the plurality of fasteners provides a compression force between the first die block and the second die block. The first die block and the second die block are constructed to provide an internal manifold and a coating slot. The die coater can include a compression differential between at least one of the plurality of fasteners and another one of the plurality of fasteners of at least about 3%. In addition, the die coater can include an offset bracket. In addition, the die coater can include a non-uniform shim.

A method for forming a coating layer having a substantially uniform thickness is provided according to the invention. A coating layer having a substantially uniform thickness can be a coating layer having a thickness uniformity of within about plus or minus 20% for low grade applications and within about plus or minus 0.5% for high grade applications. The method can include steps of adjusting a die coater to provide a coating slot with a profile having a height uniformity of within about 2%. In addition, the method can include a step of adjusting the die coater to provide a coating slot having a non-uniform profile. By providing a non-uniform profile, it is expected that it is possible to compensate for other design features of the die coater that would result in a non-uniform coating layer so that the resulting coating layer as a desired thickness uniformity.

DETAILED DESCRIPTION OF THE PREFERRED EMBODIMENT

Figure 1:
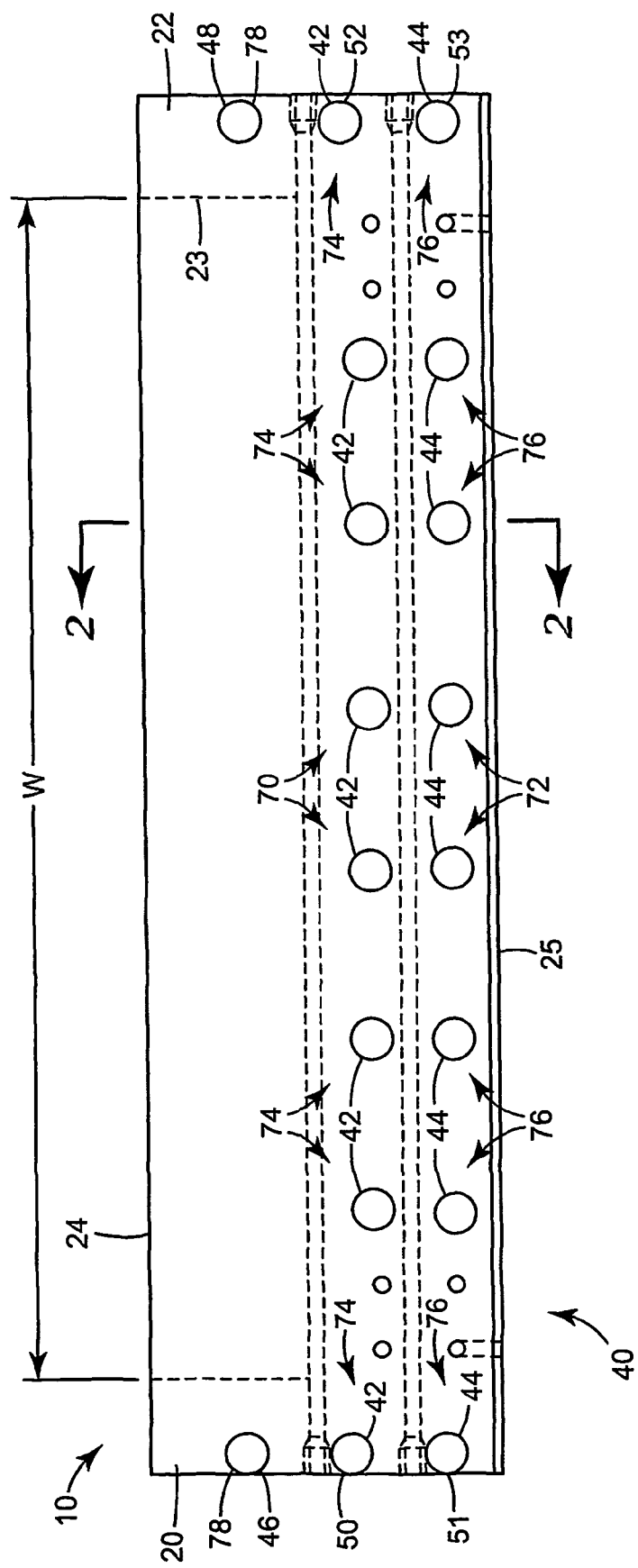
FIG. 1 is a top view of a die coater.

Techniques for achieving a coating layer having a substantially uniform thickness on a substrate are provided according to the invention. It should be understood that the phrase "substantially uniform thickness" is a relative term and depends on the desired precision of the coating layer on a substrate for a particular application. It is expected that for certain articles it may be desirable to provide a higher tolerance of uniform thickness across the coating layer than for other articles. The techniques according to the invention are provided to help achieve a desired tolerance or thickness uniformity for particular applications. The thickness uniformity of a coating layer can be provided to within about plus or minus 20% for low grade applications such as masking tape and can be provided to within about plus or minus 0.5% for high grade applications such as coatings for optical displays and precision abrasive products. The thickness uniformity of a coating refers to the uniformity across the coating wherein the thickness of the coating is determined such as by using an optical densitometer such as an optical densitometer under the name Model D200-II from Gretag Macbeth for a tinted translucent coating. The uniformity of the coating layer is calculated based on the average thickness and the average deviation from that average thickness. The reference to "across the coating" refers to the direction that is transverse to the direction of application of the coating.

It is believed that the thickness uniformity of a coating layer on a substrate is a result of several factors. Two of the factors include designing a manifold cavity in a die having a desired size to sufficiently distribute pressure and flow across the width of the die and providing the coating material with a sufficient viscosity to allow it to flow through the die in a desired manner. Another factor that is believed to influence the thickness uniformity of a coating layer is the slot profile of the coating slot of a die coater. The coating slot is the slot through which the coating material flows upon leaving the die coater. By providing a relatively uniform slot profile, it is believed that the thickness uniformity of the coating layer on a substrate can be improved. A uniform slot profile can be characterized as having a relatively uniform slot height across the coating slot and lacking a slot configuration that can be characterized as a "smile profile" or a "frown profile" or some other curving or non-uniform slot profile. A smile profile can be characterized as having a lower slot height in the center of the coating slot than at the ends of the coating slot. A frown profile can be characterized as having a higher slot height at the center of the coating slot than at the ends of the coating slot. It should be understood that the relative terms "lower" and "higher" are based upon a perspective of one looking at the coating slot straight on. For simplicity, the phrase "height uniformity" may be used in place of the phrase "relatively uniform slot height."

Several factors are believed to affect the height uniformity of the coating slot. These factors include the internal stresses in the die blocks that form the die coater, the consistent and/or inconsistent thickness of a shim used to influence the height of the coating slot, the extent of overhang provided by the die blocks that form the coating slot, and the level of precision used to prepare the coating slot. Techniques for providing a shim having a consistent thickness are disclosed by U.S. Application Publication No. 2003/0116881 A1 that was filed with the United States Patent and Trademark Office on Dec. 19, 2001. The entire disclosure of U.S. Application Publication No. 2003/0116881 A1 is incorporated herein by reference.

Several techniques are available for addressing the factors that contribute to a lack of uniform slot profile. These techniques can be used alone or in combination and include adjusting the torque or compression force on fasteners used to hold the die coater together, using an offset bracket to adjust stresses within the die coater, altering the fastener locations to adjust stresses within the die coater, adjusting the die overhang, and providing a shim having an inconsistent thickness to compensate for stresses within the die coater.

Figure 2:
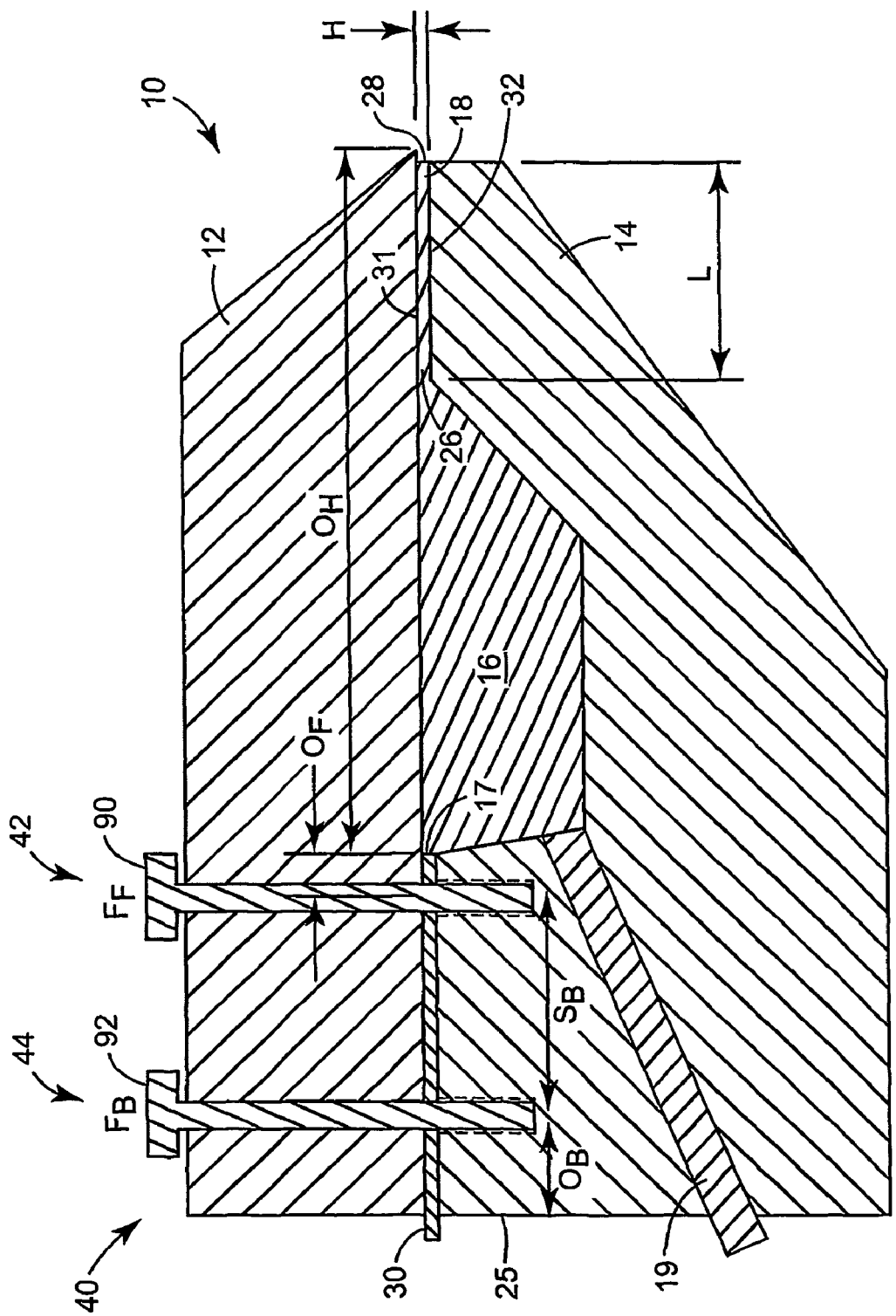
FIG. 2 is a cross-sectional view taken along lines 2-2 in FIG. 1.

Now referring to FIGS. 1 and 2, an exemplary die coater is shown at reference number 10. The die coater 10 can be characterized as a slot coater. In addition, the die coater 10 can be characterized as a "fixed slot designed" die coater because it does not have a slot that is intended to be easily adjustable. It is noted that dies are available that include bolts or other mechanisms that provide for adjustment of the slot. Although the features of a slot coater are described, one skilled in the art would understand how the features of the slot coater apply to other types of die coaters according to the invention.

The die coater 10 includes a first die block 12 and a second die block 14 that are arranged relative to each other to form the manifold cavity 16 and the coating slot 18. The manifold cavity 16 is provided for feeding coating material to the coating slot 18. During use of the die coater 10, the coating material flows, under pressure, into the manifold cavity 16 via inlet port 19, through the manifold cavity 16 through the coating slot 18, and onto a substrate (not shown) where it forms a coating layer. It is generally known that the size of the manifold cavity 16 can be adjusted to create a more even distribution of pressure throughout the coating material to help alleviate or reduce pressure drop across the manifold cavity 16 that could result in differing flow rates of coating material through the coating slot 18.

In the context of the die coater 10, several parameters of the die slot can be defined. The slot width "W" refers to the dimension of the coating slot 18 extending from the first end 20 of the die coater 10 to the second end 22 of the die coater 10, and across the die face 24. As shown in FIG. 1, the first end 20 and the second end 22 include first end slot surface 21 and second end slot surface 23 that define the width of the coating slot 18. The slot length "L" refers to the distance from the manifold cavity exit 26 to the coating slot exit 28. The slot height "H" refers to the distance between the first die block slot surface 31 and the second die block slot surface 32 at the coating slot exit 28. The slot height "H" can be controlled by use of a shim 30. The shim 30 can have a height or thickness that corresponds to the slot height "H." In addition, the shim 30 can have a thickness that is less than the slot height "H" where the shim is used for increasing the slot height. The first end slot surface 21 and the second end slot surface 23 can be provided as the shim 30. It should be understood that a die coater does not have to include a shim. That is, the coating slot can be provided as a result of the combination of the first die block and the second die block. For example, the first die block and the second die block can be machined to form the coating slot. In the situation where the die coater does not include a shim, the first end slot surface and the second end slot surface can be provided as a result of the first die block and/or the second die block.

The first die block 12 and the second die block 14 can be held together by a plurality of fasteners 40. The die coater 10 includes a forward row of fasteners 42 and a rearward row of fasteners 44. The forward row of fasteners 42 refers to the row of fasteners closest to the coating slot 18, and the rearward row of fasteners 44 refers to the row of fasteners farthest away from the coating slot 18. The die coater 10 includes a first corner fastener 46 and a second corner fastener 48. It should be understood that die coaters may or may not include corner fasteners and may or may not include an additional row(s) of fasteners.

The forward row of fasteners 42 and the rearward row of fasteners 44 are provided extending between the first die block 12 and the second die block 14 behind the coating slot 18 wherein the direction "behind" is in reference to the die face 24 being considered the front of the die coater 10 and the die back surface 25 being considered the back of the die coater 10. The forward row of fasteners 42 and the rearward row of fasteners 44 are provided extending through the shim 30 and do not extend through the manifold cavity 16. The first corner fastener 46 and the second corner fastener 48 extend between the first die block 12, the shim 30, and the second die block 14 to the sides of the coating slot 18. The plurality of fasteners 40 include first end fasteners 50 and 51 and second end fasteners 52 and 53 that are not directly "behind" the coating slot 18 but, instead, are provided off to the side of the coating slot 18. The first side fastener 50 and the second side fastener 52 can be considered as part of the forward row of fasteners 42, and the first side fastener 51 and the second side fastener 53 can be considered part of the rearward row of fasteners 44.

It should be appreciated that the die coater 10 shown in FIG. 1 is simply representative of a typical die coater held together by a plurality of fasteners 40. Exemplary die coaters can include fewer or more fasteners and can have a coating slot width that is less or greater than the slot width "W" and can have other dimensions different than the die coater 10.

The fasteners 40 can be provided as bolts that extend through the first die block 12 and the second die block 14 and hold the die blocks together so they do not move relative to each other as the coating material passes through the manifold cavity 16 and the coating slot 18. In a conventional die coater, bolts are tightened to a predetermined torque value using, for example, a torque wrench. As a result, the fasteners are often tightened to approximately the same torque value that corresponds to the torque value at which the torque wrench is set. The variation in torque between two or more bolts may reflect the accuracy of the torque wrench.

It is believed that internal stresses are created within the first die block 12 and the second die block 14 as a result of the torque or compression force placed on the fasteners 40. It is believed that for a die coater having an appropriately designed internal cavity and a relatively consistent shim thickness, the internal stresses created as a result of the relatively consistent torque or compression force placed on the fasteners may result in an inconsistent slot profile. An inconsistent slot profile can be manifest as a slot exhibiting a smile profile, a frown profile, or some other curvy or non-uniform profile. A uniform slot profile can be characterized as a slot having a height uniformity of less than about 2% across the width of the slot. The height uniformity can be less than about 1%, and can be less than about 0.5%. The height uniformity can be calculated as the total indicated runout (TIR) divided by the average height of the slot (across the width of the slot) and multiplied by 100. The total indicated runout is the difference between the maximum height and the minimum height of the slot across the width of the slot. The height of the slot can be measured using slot measuring gauge such as a Capacitec Gage available from Capacitec of Ayer, Mass. In general, slots used in die coating can have a height of between about 1 mil. and about 30 mil. (30 mil=762 microns), and a width of less than about 200 inches (5.08 meters) and often less than 100 inches (2.54 meters). By providing the coating slot with a uniform profile, and by appropriately designing other features of the die coater, it is expected that the resulting coating layer will exhibit a more uniform thickness as a result of the coating material passing through a coating slot having a uniform slot profile as opposed to a non-uniform slot profile.

This relationship between flow in the slots and the slot geometry for a power law fluid can be reflected in the equation:

$$Q/W = \left(\frac{nH^2}{2(1+2n)}\right)\left(\frac{H\Delta P}{2KL}\right)^{1/n}$$

where Q/W is the flow per unit width, H is the slot height, ΔP is the pressure differential between the entrance and exit of the slot, L is the slot length, K is the consistency index, and n is the power-law index. For Newtonian fluids n=1 and K=μ, the Newtonian viscosity. This relationship is discussed in Bird, Armstrong, and Hassager, *Dynamics of Polymeric Liquids*, Vol. 1, Wiley & Sons, NY, 1987 ISBN 0-471-80245-X (vol. 1).

In the die embodiments illustrated in FIG. 2, the uniformity of the die slot height "H" is dependent on the total indicated run-out (TIR) that reflects the flatness of each of the slot surfaces 31 and 32. Additionally, the uniformity of the die slot height depends on the TIR of the thickness of the shim 30.

The measurement of "TIR" is an indication of the tolerance, preciseness, and flatness of the surfaces. TIR is equal to the maximum value of the article being measured minus the minimum value of the article being measured.

To illustrate slot uniformity, if the slot has an indicated run-out of t, then the percent uniformity of flow from the slot is equal to:

$$\% \text{ Uniformity} = \frac{(H+t/2)^{(2+1/n)} - (H-t/2)^{(2+1/n)}}{H^{(2+1/n)}}$$

where H and n are as defined above. Percent uniformity values are computed as (maximum flow−minimum flow)/average flow×100%. 0% corresponds to a perfectly uniform crossweb profile.

Figure 3A:
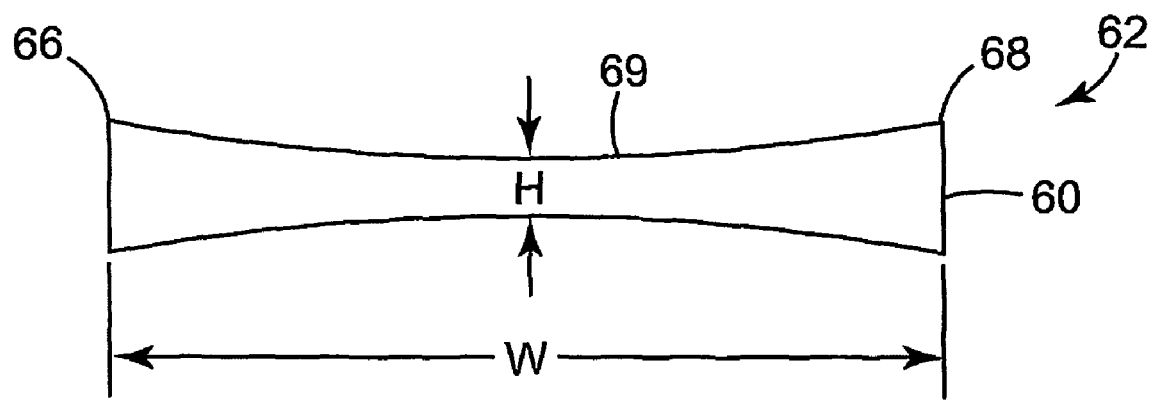
FIG. 3(a) and FIG. 3(b) are not-to-scale diagrams showing exemplary smile and frown profiles for a coating slot of a die coater.
Figure 3B:
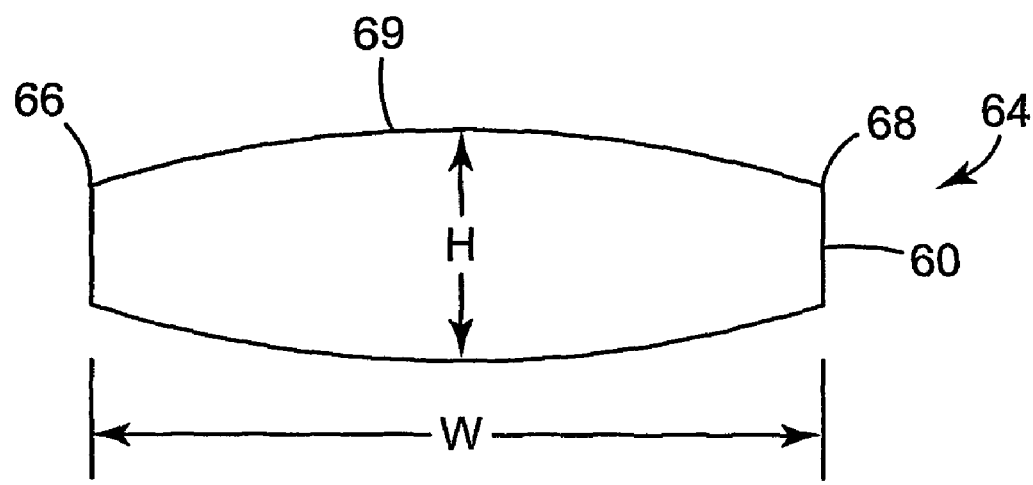

Now referring to FIG. 3(a) and FIG. 3(b), exemplary smile and frown profiles for a coating slot 60 are shown at reference numbers 62 and 64, respectively. It should be appreciated that the diagrams provided in FIG. 3(a) and FIG. 3(b) are not drawn to scale, but are drawn to illustrate what is meant by a smile profile 62 and a frown profile 64. The slot width "W" is provided as the distance across the slot 60, and the slot height "H" is provided as the distance that changes as a result of an inconsistent slot profile. According to FIG. 3(a), the slot height "H" is greater at the ends 66 and 68 compared with the middle 69. According to FIG. 3(b), the height "H" is greater at the middle 69 than at the ends 66 and 68. While smile and frown profiles are common, other types of profiles that have a wavy appearance may be encountered and can be addressed according to the present invention to provide a more consistent or uniform slot profile.

The Applicants have found techniques to address the internal stresses within the die blocks to reduce the internal stresses and/or to compensate for the internal stresses to provide a more consistent slot profile. These techniques can be used alone or in combination and include adjusting the torque or compression force on the fasteners, utilizing an offset bracket, adjusting the fastener locations, and providing a shim having an inconsistent thickness to compensate for certain stresses.

Die Bolt Torque

By providing the fasteners 40 with a non-uniform level of compression force between the first die block 12 and the second die block 14, it is possible to reduce certain stresses within the die coater 10 that would contribute to a loss of uniform slot profile. When the fasteners are provided as bolts, the level of compression can be reflected by the property of torque on the bolts.

For the die coater 10 having the configuration shown in FIGS. 1 and 2, wherein the fasteners can be characterized as a forward row of fasteners 42, a rearward row of fasteners 44, a first side fastener 46, and a second side fastener 48, the fasteners 40 can be referred to as bolts and the compression force can be referred to as torque. The relative torque on the bolts can be adjusted to address an inconsistent slot profile to achieve a more consistent slot profile. The adjustment of the torque on the bolts can be reflected in a torque difference among two or more bolts that is greater than the accuracy of the torque wrench used to provide tightening. In general, torque wrenches often exhibit an accuracy of 2-3%. When the torque has been adjusted to provide a more consistent slot profile, the difference in torque between at least two of the bolts is greater than about 3% and can be greater than about 5%.

Upon inspection of an existing slot profile, the torque on the fasteners 40 can be adjusted to provide a more uniform slot profile. Inspection of the slot refers to measuring the height of the slot along its width. The height of the slot can be measured using a slot measuring gauge such as a Capacitec gauge available from Capacitec of Ayer, Mass. Upon observing that there is a lack of uniform slot profile, the fasteners can be adjusted to provide a more uniform slot profile.

In the situation where the coating slot 18 exhibits a smile profile, several adjustments can be made to reduce or remove the smile profile. These adjustments can be made individually or in combination. These adjustments include: (a) reducing the torque at the center, front row bolts 70; (b) increasing the torque on the center, back row bolts 72; (c) increasing the torque on the end, front row bolts 74 relative to the center, front row bolts 70; (d) reducing the torque on the end, back row bolts 76 relative to the center, back row bolts 72; and (e) increasing the torque on the front corner bolts 78. In the situation where the coating slot exhibits a frown profile, several techniques can be used to reduce or remove the frown profile. These techniques can be used alone or in combination. These techniques include: (f) increasing the torque on the center, front row bolts 70; (g) decreasing the torque on the center, back row bolts 72; (h) decreasing the torque on the end, front row bolts 74 relative to the center, front row bolts 70; (i) increasing the torque on the end, back row bolts 76 relative to the center, back row bolts 72; and (j) decreasing the torque on the front corner bolts 78.

While this discussion refers to center, front row bolts 70, center, back row bolts 72, end, front row bolts 74, and end, back row bolts 76, it should be understood that the reference is intended to reflect a general placement of the bolts relative to each other. That is, other die coaters may have more or fewer bolts or fasteners, and the characterization of location is intended to reflect a more general location and is not intended to reflect an exact, precise location. One skilled in the art would understand which bolts or fasteners are considered front row or back row bolts or fasteners, and one skilled in the art would understand which fasteners are considered center and end bolts or fasteners. In addition, one skilled in the art would understand that the reference to rows of fasteners should not be taken too literally to mean a straight line of fasteners. The rows of fasteners can refer to fasteners provided in a staggered or non-linear configuration.

Several general techniques can be implemented to provide a more uniform slot profile or dies containing two or more rows of fasteners (or bolts). These techniques can be used alone or in combination and include: (k) increasing the torque on the front row bolts to decrease the coating slot in the vicinity of the bolts; (l) decreasing the torque on the front row bolts to increase the coating slot in the vicinity of the bolts; (m) increasing the torque on the back row bolts to increase the coating slot in the vicinity of the bolts; and (n) decreasing the torque on the back row bolts to decrease the coating slot in the vicinity of the bolts. It should be understood that the reference to "vicinity" refers to the coating slot characteristic provided in front of the bolt or fastener.

In order to enhance control of the height of the coating slot by adjusting the compression or torque on the fasteners or bolts, the die assembly bolt threads and the threads in the die parts should be clean, in good condition, and possibly lubricated with an appropriate lubricant or anti-seize compound. Also, it is advantageous to use die parts fabricated to be as flat as possible. If a shim is utilized, then a more uniform shim can be used such as those described in U.S. Patent Publication No. US 2003/0116881 A1, herein incorporated by reference.

Offset Bracket

Figure 4:
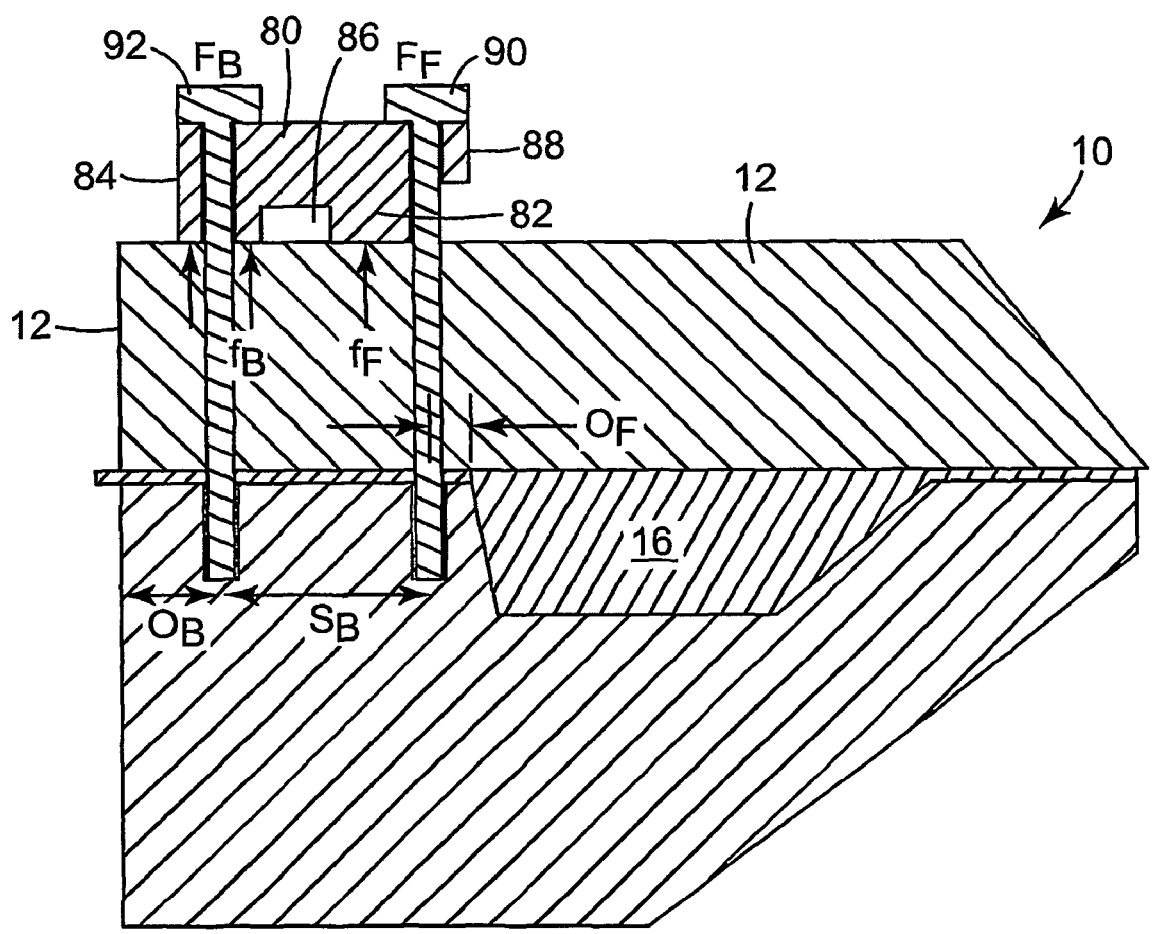
FIG. 4 is a cross-sectional view of a die coater according to FIG. 2 that includes an offset bracket.

Now referring to FIG. 4, an exemplary offset bracket for use on the die coater 10 is provided at reference number 80. In general, the use of an offset bracket is similar to the technique of altering the compression force or torque on fasteners or bolts in order to redistribute forces within the die coater 10 to achieve a more uniform slot profile. Furthermore, it should be understood that one could use a combination of die bolt torque and offset bracket techniques to achieve the desired slot profile. Furthermore, one skilled in the art would understand that various alternatively designed offset brackets can be utilized according to the invention.

The offset bracket 80 includes a forward leg 82, a rearward leg 84, an opening 86 provided between the forward leg 82 and the rearward leg 84, and an offset arm 88. The forward fastener or bolt 90 extends through the offset arm 88 and into the first die block 12. The rearward fastener or bolt 92 extends through the rearward leg 84 and into the first die block 12. Accordingly, the offset bracket 80 provides forces $F_b$ and $F_f$ on the first die block 12 that counter forces $f_B$ and $f_F$ that correspond to the location of the rearward leg 84 and the forward leg 82, respectively.

The offset bracket 80 can be characterized as an external offset bracket because the offset arm 88 extends forward of the forward leg 82. An alternatively designed external offset bracket could have the offset arm extending behind the rearward leg 84. In addition, an internal offset bracket would have the offset arm extend between the forward leg 82 and the rearward leg 84.

The offset bracket 80 can be provided so that it extends between at least one forward fastener or bolt 90 and at least one rearward fastener or bolt 92. Accordingly, a plurality of offset brackets can be provided for the die coater 10 extending between corresponding forward and rearward fasteners or bolts.

In general, the offset bracket 80 provides for a redistribution of force within the die coater 10 that is different than would be achieved without the offset bracket 80. By adjusting the forces within the die coater 10, it is expected that a more consistent slot profile can be achieved.

Figure 5A:
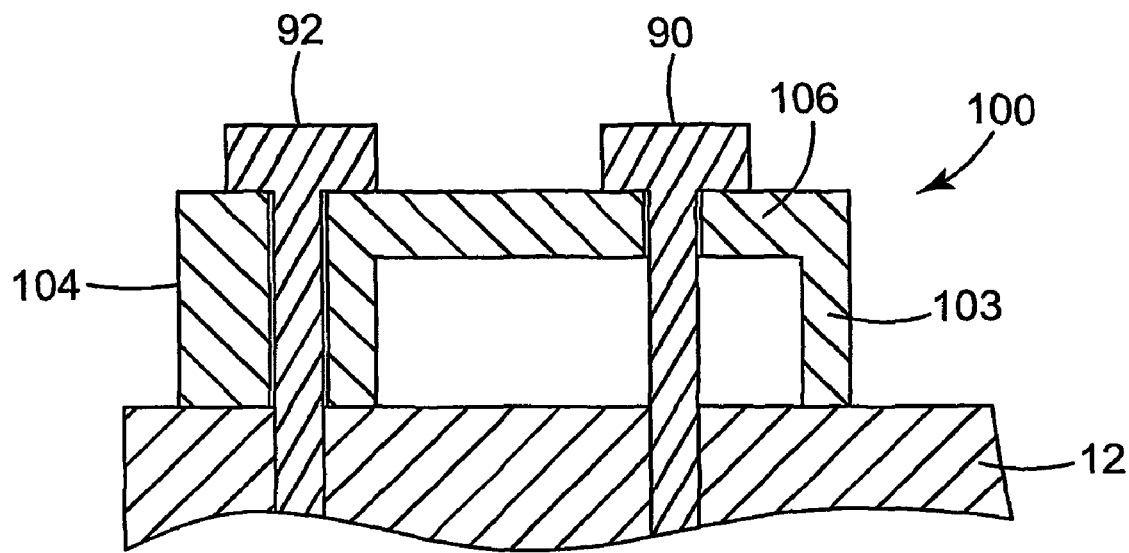
FIG. 5(a) and FIG. 5(b) are cross-sectional views of alternative offset brackets.
Figure 5B:
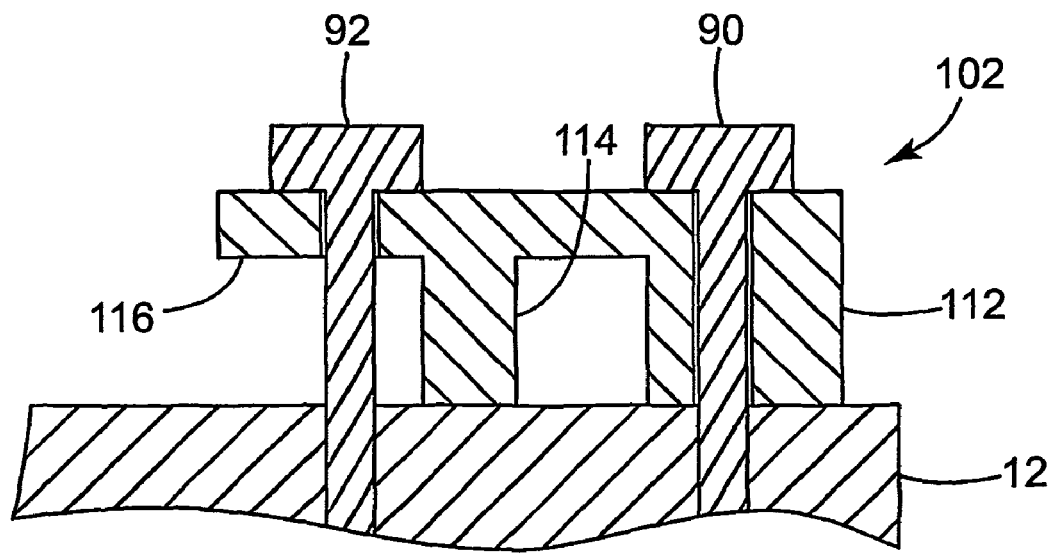

Alternative offset brackets 100 and 102 are shown in FIG. 5(*a*) and FIG. 5(*b*), respectively. The offset brackets 100 and 102 are shown attached to the first die block 12 via the forward fastener or bolt 90 and the rearward fastener or bolt 92. The offset bracket 100 includes a forward leg 103, a rearward leg 104, and an offset arm 106. The offset bracket 100 can be referred to as an internal offset bracket because the offset arm 106 is between the forward leg 103 and the rearward leg 104. The offset arm 106 can be characterized as having a distance that is based upon the distance from the forward fastener or bolt 90 to the forward leg 103. An alternative offset bracket can be provided where the offset arm is based upon the separation of the rearward fastener or bolt 92 and the rearward leg 104. The offset bracket 102 includes a forward leg 112, a rearward leg 114, and an offset arm 116. The offset arm 116 can be characterized as having a distance that is equivalent to the distance between the rearward leg 114 and the rearward fastener or bolt 92. The offset bracket 102 can be referred to as an external offset bracket. It should be understood that the distances between fasteners and legs can be calculated based upon a center of force provided by the fastener and by the leg. The showing of a center of force measurement is provided in the figures.

The offset bracket can be designed to provide the desired force on a particular area of the die coater. In general, for the offset bracket 80, the value $O_F$ is the distance between the forward fastener or bolt 90 and the internal cavity 16, the value $S_B$ is the distance between the forward fastener or bolt 90 and the rearward fastener or bolt 92, the value of $O_B$ is the distance between the rearward fastener or bolt 92 and the die back surface 25, the value of $T_{front}$ is the torque on the forward fastener or bolt 90, and $T_{back}$ is the torque on the rearward fastener or bolt 92. It should be understood that the distance from a fastener is measured based upon the center of force of the fastener. Using these values, the offset bracket and the torque on each fastener or bolt can be selected according to the following equation:

$$T_{front} = T_{back}\left(\frac{S_b + O_f - O_B}{S_b - O_F - O_B}\right)$$

The offset bracket provides a redistribution of force as contributed by at least one of the fasteners from the forward row and at least one of the fasteners from the rearward row. It should be understood that the offset bracket can include additional fasteners, and several offset brackets can be used to redistribute forces within a die coater.

Die Bolt Location

Another technique for providing a uniform die slot includes redesigning the die bolt spacings to provide the desired stress configuration within the die coater. Referring to FIG. 2, $O_F$ refers to the distance between the forward fastener or bolt 90 and the internal manifold 16, $O_B$ refers to the distance between the rearward fastener or bolt 92 and the die back surface 25, $S_B$ refers to the distance between the forward fastener or bolt 90 and the rearward fastener or bolt 92. To avoid a slot profile that can be considered a smile slot profile, the value of $O_F$ can be increased, and the value of $O_B$ can be decreased. To avoid a slot profile that can be considered a frown slot profile, the value of $O_F$ can be decreased, and the value of $O_B$ can be increased. Additional techniques for adjusting the location of the fasteners or bolts to provide a more uniform slot profile include using two or more rows of fasteners to allow adjusting the coating slot uniformity, and nominally spacing the fasteners symmetrically such that the value of $O_F$ is approximately the same as the value of $O_B$.

Die Overhang

In another embodiment of the present invention, it is recognized that reducing the overhang of the die top will preferably minimize the inherent "smile" profile in the die slot. The overhang "$O_H$" is the distance from the rear of a die manifold rear 17 to the leading edge of the slot in the die 28. FIG. 2 shows an overhang on a standard die. In general, the overhang can be decreased to provide a reduction in a smile profile.

Non-Uniform Shim

Another technique for adjusting the stresses within a die coater include providing a non-uniform shim that compensates for the forces found within the die coater to provide a more uniform slot profile. A non-uniform shim can be prepared as a result of use of a grinder with crown grinding capability (i.e. a "crown grinder"). The thickness of the shim can be varied as desired to compensate for the forces found within the die coater so that the resulting die coater has a uniform slot profile. A precision grinder has the ability to grind a crown or reverse crown profile with a thickness variation in the range of about 0.0 mils (0.0 microns) to about 6 mils (152 microns). Techniques for grinding a shim are disclosed in U.S. Patent Publication No. US 2003/0116881 A1, the disclosure relating to the manufacture of a shim being incorporated herein by reference.

In general, it may be desirable to utilize the "die bolt location" and "die overhang" criteria for designing a die coater to provide a desired uniform slot profile. The techniques of utilizing "die bolt torque" and "offset bracket" can be used as curatives to provide a desired uniform slot profile. That is, the use of differing die bolt torques and/or the use of offset brackets can compensate for a non-uniform slot profile to provide a more uniform slot profile. It is generally expected that the techniques of selecting the die bolt location and the die overhang are generally design criteria for designing a die coater.

It should additionally be understood that these techniques for altering the coating slot can be used to create a non-uniform coating slot that compensates for other design criteria that may otherwise result in a non-uniform coating. For example, an internal cavity that is too small and/or a coating material that is viscous or not viscous enough may provide a non-uniform coating unless the coating slot is adjusted to provide a non-uniform slot. The techniques described herein can be utilized both for providing a uniform slot profile and a non-uniform slot profile. It should be understood that these techniques can be used to generate a more uniform coating thickness on a substrate.

EXAMPLES

Example 1

Table 1 exemplifies the improved results of the present invention. The table indicates that a maximum die overhang of about 4.7 inches prevents the inherent problems associated with the longer overhangs.

TABLE 1

| Rating | Die | Total Indicated Runout, TIR With Uniform Bolt Torque microinch | Top Thick inch | Bottom Thick inch | Die Length inch | Die Depth inch | $O_F$ | $O_B$ | Die Top Overhang inch |
|---|---|---|---|---|---|---|---|---|---|
| "Worst" | A | 145 @ 20 ft-lbs "Smile" 180 @ 34 ft-lbs "Smile" | 2 | 4 | 31.75 | 8 | 0.42 | 0.94 | 4.74 |
| "Bad" | B | 90 @ 60 ft-lbs or 100 ft-lbs "Smile" | 3 | 6 | 78 | 12 | 1.38 | 1.00 | 6.37 |
| "Good" | C | 30 @ 30 ft-lbs, "Smile" | 1.5 | 2.25 | 20 | 6 | 1.42 | 0.94 | 2.14 |
| "Good" | D | 20 @ 20 ft-lbs to 30 ft-lbs | 1.5 | 2.25 | 9 | 6 | 1.01 | 0.94 | 2.55 |

| Rating | Die | $O_F/O_B$ | Ratio Overhang/Die Depth | (Overhang/Top thickness)$^3$ | (Overhang/Top thickness)$^3$/E Modulus Stainless Steel About $28 \times 10^6$ lbs/in$^2$ |
|---|---|---|---|---|---|
| "Worst" | A | 0.45 | 0.59 | 13.35 | 4.77E–07 |
| "Bad" | B | 1.38 | 0.53 | 9.56 | 3.42E–07 |
| "Good" | C | 1.52 | 0.36 | 2.90 | 1.04E–07 |
| "Good" | D | 1.07 | 0.43 | 4.92 | 1.76E–07 |

The data in Table 1 reflects general design criteria that may be relied upon to provide a more uniform slot profile. For example, the overhang of a die coater can be provided as less than about 4.7 inches. In addition, the (overhang/thickness ratio)$^3$ (the ratio of the length of overhang to the thickness of the die block containing the overhang cubed) can be less than about 9. Furthermore, the ratio of the (overhang/thickness ratio)$^3$ to the modulus (the modulus of the die block containing the overhang) can be less than about $3.0 \times 10^{-7}$ in$^2$/lb.

Example 2

Initially, the die was assembled as in FIGS. 1 and 2 while applying 34 ft-lbs. to all die assembly bolts. The coating slot height was measured using a Capacitec Gage available from Capacitec of Ayer, Mass. The resultant die slot corresponds to a "smile" profile slanted lower on the right side of the coating die.

Figure 6:
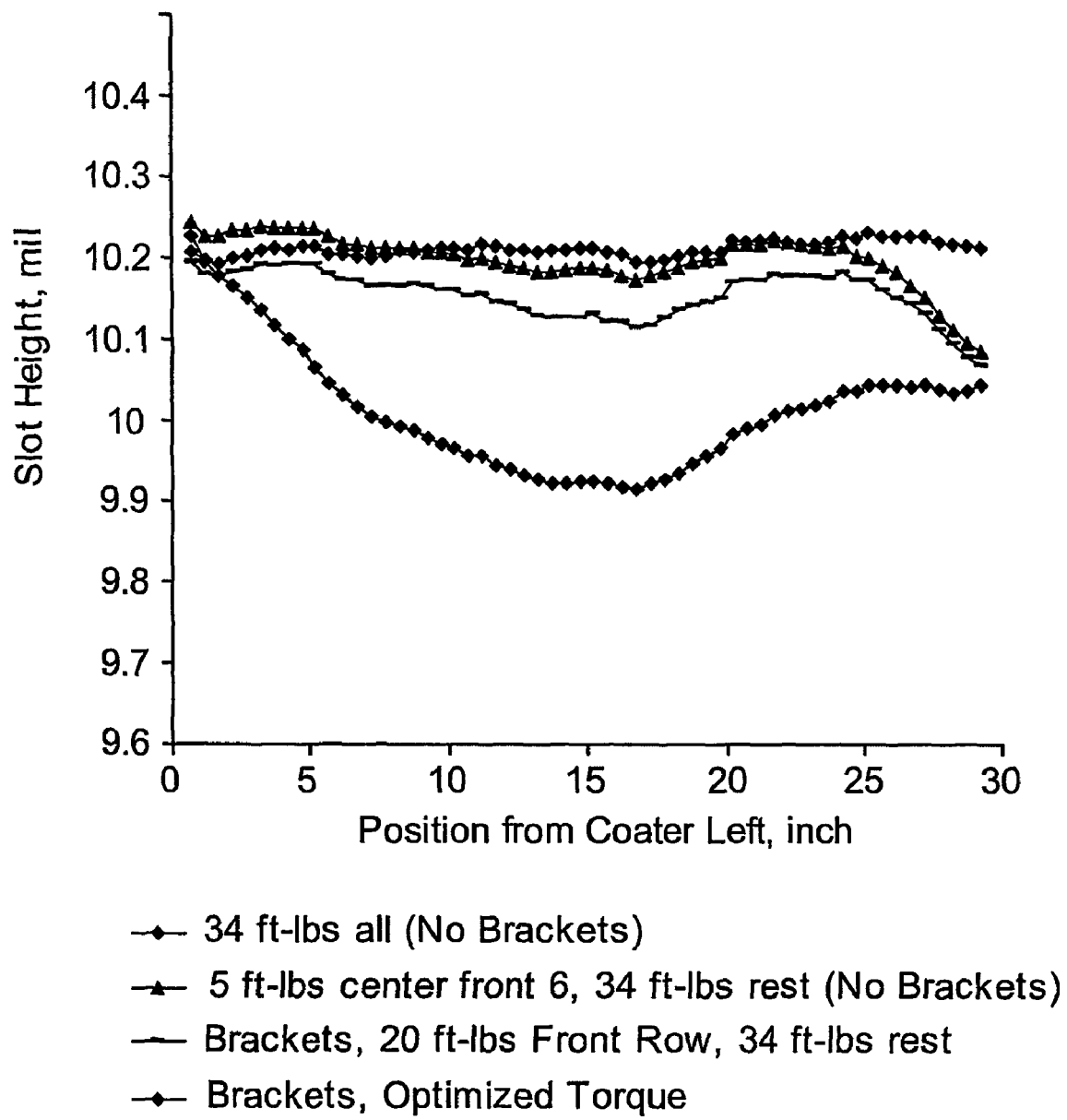
FIG. 6 is a graph of slot height for Examples 2-5.

The results are shown in FIG. 6 corresponding to a "smile" profile slanted lower on the right slot of the die.

Example 3

The die from Example 2 was adjusted using the methods of this invention whereby the torque on the center front bolts was reduced to 5 ft-lbs. This resulted in removal of the undesired "smile" profile. The results of this example are reported in FIG. 6.

Example 4

Because 5 ft-lbs. is a small torque, subjecting the actual die assembly forces to greater variation due to mechanical limitations like thread friction, it was desired to use an offset bracket as depicted in FIG. 4. Initially, the die was assembled as in FIGS. 1 and 2 except using the offset bracket of FIG. 4. The offset bracket was fabricated so that the force acting on the die top was symmetric and the same on the front and back bolt rows.

To accomplish this, an appropriate bolt torque on front and back bolts was chosen. For this, assuming that bolt force is proportional to torque, $f_F = f_B$, $f_F + f_B = F_F + F_B$, that we choose to have the new bracket pad offset from the manifold the same as the back bolt space from the back of the die $O_B$, and that the forces acting to rotate the bracket balance $F_F(S_B) = f_F(S_B - O_B + O_F)$ then $$T_{Front} = T_{Back} \left( \frac{S_B + O_F - O_B}{S_B - O_F + O_B} \right)$$

For a standard slot extrusion die as shown in FIG. 4, having dimensions of: $S_B = 1.896$ inch, $O_F = 0.432$ inch, $O_B = 0.938$ inch, so for $T_{back} = 34$ ft-lbs, then $T_{front} 19.7$ ft-lbs. Due to the accuracy of the Torque Wrench, $T_{front} = 20$ ft-lbs was used.

The results indicate that the slot can be made flat (removing the "Smile") by using the brackets at the calculated torques. This means, brackets are suitable at a larger bolt torque (20 ft-lbs) and resulting in larger assembly force for better sealing and more consistent die assembly with the brackets than by just using a lower torque (about 5 ft-lbs) on the front row center 6 bolts.

The results of this example are reported in FIG. 6.

Example 5

Example 4 was repeated except that the torque on the bolts was adjusted to provide a uniform slot profile across the die face. The slant in the die slot profile remaining in the die with offset brackets was removed by further adjusting the die bolt torques by the methods of this invention to the optimized values and the coating die slot was measured using a Capacitec gauge available from Capacitec of Ayer, Mass. The following torques were provided:
Right front corner 0 ft-lbs.
Left front corner 34 ft.-lbs.
Front Row (L to R) 34, 20, 5, 5, 20, 30, 34 ft-lbs.
Back Row (L to R) 34, 34, 34, 40, 40, 34, 34, 34, ft-lbs.

The results of this example are reported in FIG. 6.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A die coater comprising a first die block, a second die block, and a plurality of fasteners holding the first die block and the second die block together, wherein:
   (a) each of the plurality of fasteners extends through the first die block, into the second die block, and provides a compression force between the first die block and the second die block;

(b) the first die block and the second die block are constructed to provide an internal manifold and a coating slot; and (c) some of said fasteners are located behind the internal manifold, where the term behind is with reference to the die face being considered the front of the die coater, and are arranged so that some are rearward fasteners and some are forward fasteners, the forward fasteners being closer to the coating slot of the die than the rearward fasteners, said die coater characterized in that: the fasteners of part (c) comprise a forward row of fasteners and a rearward row of fasteners in which $O_F$ refers to the distance between a forward fastener and the internal manifold, $O_B$ refers to the distance between the rearward fastener and the die back surface, and the forward and rearward fasteners are spaced symmetrically so that the value of $O_F$ is approximately the same as $O_B$; at least two of said fasteners, one rearward fastener and the forward fastener nearest said rearward fastener, have a torque differential of greater than about 5%; the die coater has an overhang $O_H$, defined as the linear distance along the first die block surface facing the coating slot of the die from the rear of the die manifold to the leading edge of the die slot, of less than about 119 mm; the cube of the ratio of overhang to the thickness of the first die block is less than about 9; and the quantity defined by the cube of the ratio of the overhang/thickness divided by the modulus of elasticity of the first die block is less than about $3.0 \times 10^{-7}$ in$^2$/lb ($4.35 \times 10^{-5}$ Mpa$^{-1}$).

2. A die coater, comprising a first die block, a second die block, and a plurality of fasteners holding the first die block and the second die block together, wherein:

(a) each of the plurality of fasteners extends through the first die block, into the second die block, and provides a compression force between the first die block and the second die block;

(b) the first die block and the second die block are constructed to provide an internal manifold and a coating slot; and (c) some of said fasteners are located behind the internal manifold, where the term behind is with reference to the die face being considered the front of the die coater, and are arranged so that some are rearward fasteners and some are forward fasteners, the forward fasteners being closer to the coating slot of the die than the rearward fasteners, said die coater further comprising an offset bracket for adjusting the compression force between at least one forward fastener and at least one rearward fastener both of which are located behind the internal manifold and extend through the offset bracket, said offset bracket comprising a forward leg, a rearward leg, an offset arm and having an opening between the forward and rearward legs, the offset arm extending forward of the forward leg, rearward of the rearward leg or being between the forward and rearward legs, and characterized in that at least two of said fasteners, one rearward and the forward fastener nearest said rearward fastener, have a torque differential of greater than about 3%.

3. A die coater according to claim 2, wherein the coating slot has a height uniformity of within about 1.5%.

4. A die coater according to claim 2, wherein the coating slot has a height uniformity of within about 1%.

5. A die coater comprising a first die block, a second die block, and a plurality of fasteners holding the first die block and the second die block together, and an offset bracket comprising a forward leg, a rearward leg, an offset arm and having an opening between the forward and rearward legs, the offset arm extending forward of the forward leg, rearward of the rearward leg or being between the forward and rearward legs, wherein:

(a) each of the plurality of fasteners extends through the first die block, into the second die block, and provides a compression force between the first die block and the second die block; and (b) the first die block and the second die block are constructed to provide an internal manifold and a coating slot; and (c) some of said fasteners are located behind the internal manifold, where the term behind is with reference to the die face being considered the front of the die coater, are arranged so that some are rearward fasteners and some are forward fasteners, forward fasteners being closer to the coating slot than the rearward fasteners, and at least one of said fasteners extends through a forward leg or a rearward leg of the offset bracket and at least one fastener extends through the offset arm and not through a forward or rearward leg, for distributing the compression force between the first die block and the second die block differently than would be provided without the offset bracket.

6. The die coater according to claim 5, for which certain parameters are defined as $O_F$ is the distance between the forward fastener extending through the offset bracket and the internal manifold, $O_B$ is the distance between the rearward fastener extending through the offset bracket and the back surface of the die $S_B$ is the center-to-center distance between the forward and rearward fasteners, $T_{front}$ is the torque on the forward fastener, and $T_{back}$ is the torque on the rearward fastener, and the relationship of $T_{front}$ to $T_{back}$ is defined by the following equation $$T_{front} = T_{back}\left(\frac{S_B + O_F - O_B}{S_B - O_F - O_B}\right).$$

7. A die coater according to claim 5, wherein the coating slot has a height uniformity of within about 1%.

8. A die coater according to claim 5, wherein at least two of the plurality of fasteners have a torque difference of greater than about 3%.

9. A die coater comprising a first die block, a second die block, and a plurality of fasteners holding the first die block and the second die block together, wherein:

(a) each of the plurality of fasteners extends through the first die block, into the second die block, and provides a compression force between the first die block and the second die block;

(b) the first die block and the second die block are constructed to provide an internal manifold and a coating slot;

(c) the die coater has an overhang $O_H$, defined as the linear distance along the first die block surface facing the coating slot of the die from the rear of the die manifold to the leading edge of the die slot, of less than about 119 mm; and (d) the die coater is characterized by a cube of the ratio of overhang to thickness of the first die block of less than about 9; and (e) the quantity defined by the cube of the ratio of the overhang/thickness divided by the modulus of elasticity of the first die block is less than about $3.0 \times 10^{-7}$ in$^2$/lb ($4.35 \times 10^{-5}$ Mpa$^{-1}$).

* * * * *

UNITED STATES PATENT AND TRADEMARK OFFICE
CERTIFICATE OF CORRECTION

PATENT NO. : 7,819,077 B2
APPLICATION NO. : 10/595152
DATED : October 26, 2010
INVENTOR(S) : Robert A Yapel It is certified that error appears in the above-identified patent and that said Letters Patent is hereby corrected as shown below:

On the Title Page, Item (74) under (Attorney, Agent, or Firm)
Line 1, delete "Douglas R. Little" and insert -- Douglas B. Little --, therefor.

Column 13
Line 29, in Claim 1, delete "$(4.35 \times 10^{-5} \text{ Mpa}^{-1})$." and insert -- $(4.35 \times 10^{-5} \text{ MPa}^{-1})$. --, therefor.

Column 14
Line 64, in Claim 9, delete "$(4.35 \times 10^{-5} \text{Mpa}^{-1})$." and insert -- $(4.35 \times 10^{-5} \text{ MPa}^{-1})$. --, therefor.

Signed and Sealed this
Twenty-eighth Day of December, 2010

David J. Kappos
*Director of the United States Patent and Trademark Office*